Jan. 17, 1967  J. T. STURDEVANT  3,299,273
OPTICAL GAUGING SYSTEM WITH INTERCHANGEABLE MASKS
Filed Aug. 17, 1964  5 Sheets-Sheet 2

INVENTOR.
JOSEPH T. STURDEVANT

BY  ATTORNEY

Jan. 17, 1967   J. T. STURDEVANT   3,299,273
OPTICAL GAUGING SYSTEM WITH INTERCHANGEABLE MASKS
Filed Aug. 17, 1964   5 Sheets-Sheet 4

INVENTOR.
JOSEPH T. STURDEVANT

BY
ATTORNEY

# United States Patent Office 3,299,273
Patented Jan. 17, 1967

3,299,273
OPTICAL GAUGING SYSTEM WITH INTERCHANGEABLE MASKS
Joseph T. Sturdevant, 4151 Pepper Tree Lane,
San Jose, Calif. 95127
Filed Aug. 17, 1964, Ser. No. 389,867
8 Claims. (Cl. 250—229)

This invention relates to an optical measuring system for the measurement of area, concentricity, accentricity, radius, diameter and the like of objects and openings through objects by optical means.

For many applications the dimensions of workpieces must be held to close tolerances to meet stringent operating conditions. For example, the operating life of an annular oil seal, say for use in the transmission of an automobile, is directly related to the dimensional accuracy with which the seal is formed. A typical seal for use on a shaft often comprises a solid channel shaped supporting case formed in a ring, with the channel opening toward the inside of the ring. A flexible sealing member of plastic, rubber or the like is seated in the channel member on a resilient back up member at the bottom of the channel. The inside diameter of the annular sealing member and the roundness and concentricity with respect to the outside diameter of the solid case must be maintained to close tolerances for a long seal life.

In the production of such seal rings, it is common practice to measure a sample number thereof during production. Since the inner seal ring is not rigidly supported in the outer channel member, optical rather than mechanical means are preferably employed to check the same. One common practice comprises examining the seal with an optical comparator gauge. With such an arrangement the image is greatly enlarged and compared with an ideal configuration. In viewing the seal in the optical comparator, however, the outline of the seal member is often not clear but instead appears as a distorted line. Therefore, the accuracy of the inspection depends largely upon the judgment and ability of the operator. Further, since the measurements cannot be made rapidly only a small sampling of the seals is generally possible.

An object of this invention is the provision of an improved optical measuring instrument for the measurement of area, diameter, radius, eccentricity, ovalness and the like dimensions of a workpiece.

An object of this invention is the provision of an optical measuring instrument of simple construction yet capable of precision measurements.

An object of this invention is the provision of an optical measuring instrument having a high resolution.

These and other objects and advantages are obtained by an arrangement in which the workpiece is placed in a beam of collimated light. A mask having a pattern of opaque and transparent areas depending upon the size and shape of the workpiece and the particular workpiece dimension being measured is also placed in the light beam path. The mask together with the workpiece block out most of the light beam. A light receiver such as a photocell is positioned to receive the small amount of light which passes the mask and workpiece. By proper calibration, the amount of light passing the workpiece and mask may provide a direct indication of the dimension being measured. By blocking out most of the light the percentage change of light at the receiver with small dimensional differences in workpieces is very large. For this reason the apparatus has a high resolution. For the measurement of eccentricity and ovalness of the workpiece suitable masks are employed and the mask and workpiece are relatively rotatable about an axis parallel to the collimated light. For measurement of accentricity (or concentricity) all but a thin generally semi-annular beam of light is blocked out, and for ovalness measurements all but a pair of diametrically opposed annular beam segments are blocked out. With such arrangements, the change in the amount of light striking the light receiver as the workpiece and mask are relatively rotated provides a measure of the eccentricity and ovalness, respectively, of the workpiece.

In the drawings wherein like reference characters refer to the same parts in the several views.

Figure 1:
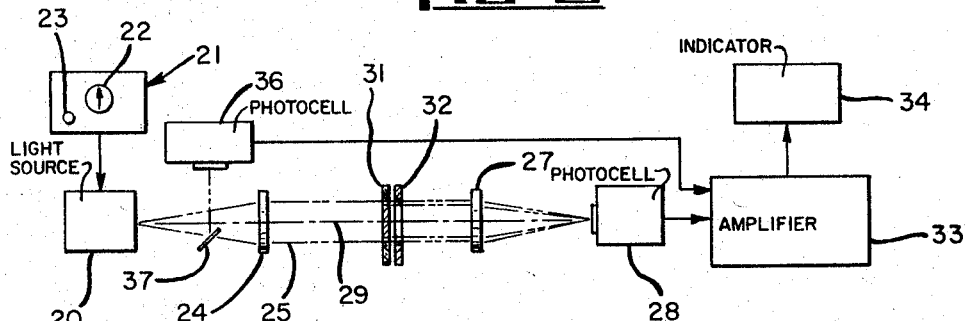
FIGURE 1 is a diagrammatic view of an optical measuring instrument embodying this invention and including a block diagram of an electronic circuit for use therewith.

Referring now to FIGURE 1 of the drawings the apparatus of this invention is shown comprising a source of collimated light which may include a light source 20 energized by the output from a regulated power supply 21. The power supply preferably includes an ammeter 22 for an indication of the current output to the lamp 20, and a knob 23 for the adjustment thereof.

The light from the light source 20 is collimated by a collimating lens 24 (or lens system, if desired) whereby the illumination from the lens 24 comprises a collimated beam 25. It will here be understood that although the apparatus is described as operating with light energy falling within the visible light region of the spectrum, it may be operated with energy to either side of the light spectrum. The use of the term optical, or light beam throughout the specification and claims specifically includes such visible and invisible energy.

A focusing lens 27 is positioned in the light beam path for focusing the light on a light receiver 28. A photocell of the photovoltaic or photoresistance type may be employed as the light receiver, and in the described arrangement a photoresistance cell is employed. It will be further understood that although the light beam is described as being focused on the photocell, it may be desired that the photocell be located at either side of the prime focus point along the optical axis designated 29. With the beam out of focus, the light strikes a greater surface of the photocell for improved operation thereof. The use of the term focused therefore, includes such misfocusing of the beam on the receiver. Obviously, if the photocell were of sufficient size to receive all of the collimated light of the beam without focusing, no focusing lens would be required.

Interposed in the light beam path between the collimating and focusing lenses 24 and 27 are a mask 31 and a workpiece 32. Together the mask and workpiece block out most of the illumination from the light source 20 whereby only a small percentage thereof strikes the photocell 28. The photocell 28 is connected to an amplifier 33 and the output from the amplifier is fed to an indicator 34 such as a voltmeter which may be calibrated in terms of the dimension of the workpiece under measurement. As an apparent alternative, the indicator 34 may be of the go-no-go type which includes lamps which are illuminated to indicate whether or not the dimension under measurement is within permissible tolerances. In either case variations in light falling on the photocell are converted to electrical variations which may be supplied to an indicator 34.

To automatically compensate for variations in illumination of the light source 20, the arrangement may be provided with a second photocell 36 which is illuminated by a small portion of the light from the source 20. In the illustrated arrangement the photocell 36 is displaced radially from the light beam axis 29 and a mirror 37, or other suitable reflector diverts some of the light from the source 20 onto the photocell 36. With this arrangement the amplifier 33 comprises a differential amplifier having a second input from the photocell 36. A change in the intensity of illumination from the source 20 results in equal percentage changes in the light striking the photocells 28 and 36, and the amplifier 33 is adapted to provide a substantially constant output with such changes.

Figure 2:
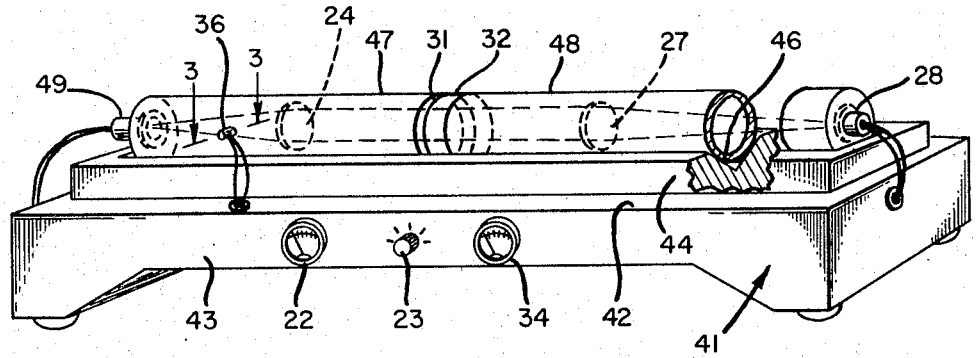
FIGURE 2 is a perspective view of an optical measuring instrument embodying this invention in which arrangement the optical axis is horizontally disposed.

Reference is now made to FIGURE 2 wherein there is illustrated one embodiment of this invention which comprises an elongated housing 41 having a flat rectangular-shaped top 42. The necessary electronic circuitry including the regulated power supply 21 and differential amplifier 33 may be mounted within the housing, with the ammeter 22, control knob 23 and voltmeter 34 mounted on the front panel 43 thereof. A slideway 44 having a V-shaped groove 46 extending longitudinally thereof is attached to the top 42 of the housing by means not shown. The slideway is used to support the mask 31, workpiece 32 and a pair of tubular cylinders 47 and 48. In the illustrated arrangement the mask 31 and workpiece 32 are of a circular shape and have the same outside diameter as the cylinders 47 and 48 whereby they are positioned on a common axis with the cylinders.

The cylinders 47 and 48 are each formed with an open and a closed end and are positioned on the ways with the open ends spaced apart and facing each other. The mask 31 and workpiece 32 are located between the cylinders, and the cylinders may be slid together and away from each other. By sliding the cylinders together the mask and workpiece may be butted together and against the ends of the adjacent cylinders.

Figure 3:
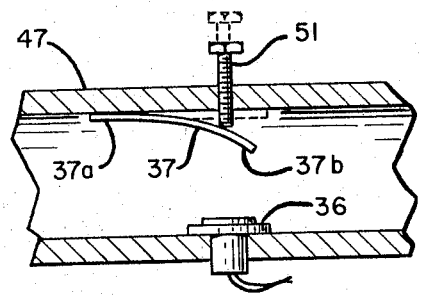
FIGURE 3 is an enlarged fragmentary cross sectional view taken on line 3—3 of FIGURE 2.

A socket 49 is attached to the closed end of the cylinder 47 for the support of the light source 20 within the cylinder adjacent said closed end. The collimating lens 24 is mounted in the cylinder 47 about midway between the ends thereof by any suitable means not shown. Intermediate the lamp 20 and collimating lens 24 the photocell 36 and mirror 37 are mounted. As seen in the enlarged fragmentary sectional view of FIGURE 3, the photocell 36 and mirror 37 are secured to diagonally opposite points on the cylinder wall. The mirror may simply comprise a resilient metallic tab with a reflecting surface, which tab is attached at one end 37A to the inner tube wall. The outer end 37B of the tab may be flexed outwardly by an adjustment screw 51 which threadedly engages a tapped hole in the tube. The end of the screw abuts the free end 37B of the tab for moving said free end away from the inside wall surface of the tube. With the tab in the illustrated solid line position, a portion of the light from the lamp 20 is reflected therefrom and directed onto the photocell 36. By turning the screw out the mirror assumes the broken line position wherein substantially none of the light from the lamp is reflected onto the photocell 36. For experimental use of the instrument, such an adjustable mirror is of particular value since it is sometimes desired to adjust the intensity of illumination of the lamp and to measure the effects thereof at the amplifier output.

The focusing lens 27 is mounted in the cylinder 48 intermediate the open and closed ends thereof by any suitable means not shown, and the photocell 28 is attached to the end wall of the cylinder 48 to receive light from the focusing lens 27. As mentioned above, the illumination from the focusing lens may be brought to a prime focus at the face of the photocell but is preferably slightly out of focus therewith whereby the light strikes an area of the photocell rather than a point thereon. In either case, all of the light passing the workpiece and mask is directed onto the photocell 28.

Figure 4:
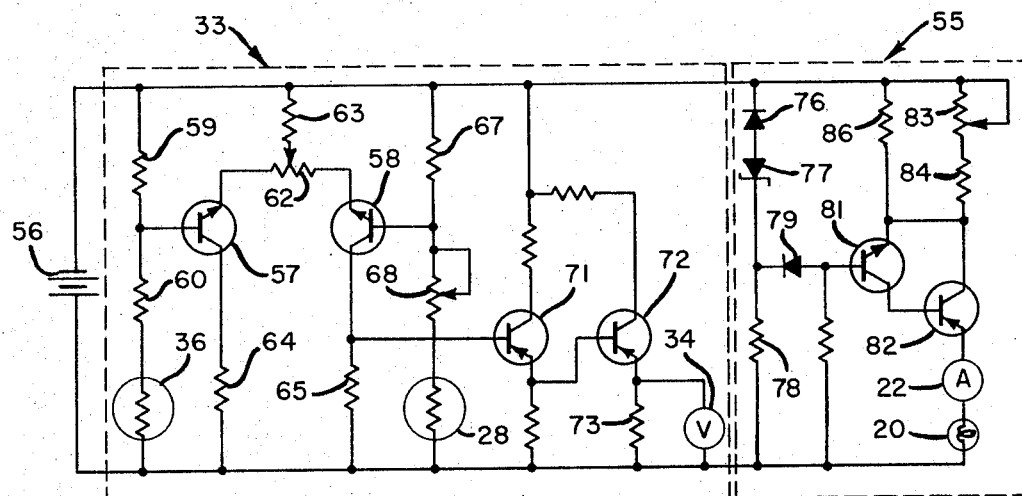
FIGURE 4 is a schematic circuit diagram of the electronic portion of the apparatus of this invention.

Reference is now made to FIGURE 4 of the drawings wherein a schematic circuit diagram of the driver stage 55 for the lamp 20 and the differential amplifier 33 are shown. A regulated negative 20 volt D.C. supply source 56 which may be of conventional design provides power for both the driver stage 55 and amplifier 33. The amplifier 33 is shown including a differential amplification stage comprising the NPN type transistors 57 and 58. The input to the base electrode of the transistor 57 is provided by a connection to the junction between a pair of series connected resistors 59 and 60, which resistors are in series with the compensating photocell 36 and connected across the source 56. Although the photocells 36 and 28 may be of any desired type, photoconductive cells of the cadmium sulfide type are shown and described. It will be here understood that the invention is not limited to use with photoconductive cells made of cadmium sulfide. Numerous other photoactive materials are known and may be employed in this invention. With the series connected resistors 59 and 60 and photoconductive cell 36 connected across the D.C. source 56, any change in the conductance of the photocell 36 to a change in illumination thereof will change the potential at the base electrode of the transistor 57 to change the output at the emitter electrode thereof. The emitter electrodes for both transistors 57 and 58 are connected to opposite ends of a potentiometer 62, the movable arm of which potentiometer connects through a resistor 63 to the negative supply 56. The collector electrodes of the transistors 57 and 58 are connected to ground potential through resistors 64 and 65. A change in the conductance of the photocell 36 thereby produces a change in reverse bias on the collector-base junction of the transistor 57 to change the emitter current which flows through the common emitter resistor 63. A variable forward bias on the base-emitter junction of the transistor 58 is thereby provided as one input to the transistor 58.

The transistor 58 is supplied with a second input from the main photocell 28. The photocell 28 is connected in series with a resistor 67 and potentiometer 68 across the D.C. source 56, and the junction between the resistor and potentiometer is connected to the base electrode of the transistor 58. The output from the differential amplifier stage is taken from across the collector resistor 65 and applied to the first of two emitter follower stages comprising transistors 71 and 72. The mirror 37 and differential amplifier circuit are adjusted such that at the normal operating level of the photocell 28, a change in the illumination of the lamp 20 produces no change in the amplifier output to the emitter follower transistor 71. The emitter follower stages are of conventional design and require no further explanation. The indicator 34 comprising a voltmeter is in shunt with the emitter resistor 73 of the transistor 72 for an indication of the output therefrom.

The driver amplifier 55 for supplying an adjustable current to the lamp 20 is also shown in FIGURE 4 and may comprise a series connected temperature compensating diode 76, Zener diode 77 and resistor 78 connected across the negative source 56. The Zener diode 77 is connected in the reverse direction and operates in the Zener conducting region wherein the voltage thereacross remains substantially constant. The Zener diode therefore functions essentially as a voltage reference device. A second temperature compensating diode 79 connects the junction between the Zener diode 77 and resistor 78 to the base electrode of a PNP type transistor 81. The collector electrode of the transistor 81 is directly connected to the base electrode of a second transistor 82 of the NPN type, and the emitter and collector electrodes of the transistors 81 and 82, respectively, are connected together and to the negative terminal of the supply source 56 through a series connected potentiometer 83 and resistor 84, and a resistor 86 in shunt with said series connected potentiometer 83 and resistor 84. The lamp 20 and ammeter 22 are in series connection in the emitter circuit of the transistor 82. By adjusting the potentiometer 83 by the knob 23 (FIGURE 1) the current through the lamp 20 may be adjusted. The transistor complimentary pair 81 and 82 has a high output impedance and provides a precise current drive into lamp 20 whereby changes in the impedance of the lamp with changes in temperature have substantially no effect upon the lamp current. Thus, with the illustrated arrangement of transistors and temperature compensating diodes, a constant current output is supplied to the lamp 20 from the driver. Other regulating and lamp driver arrangements may be employed for regulating the input to the lamp 20.

Figure 5:
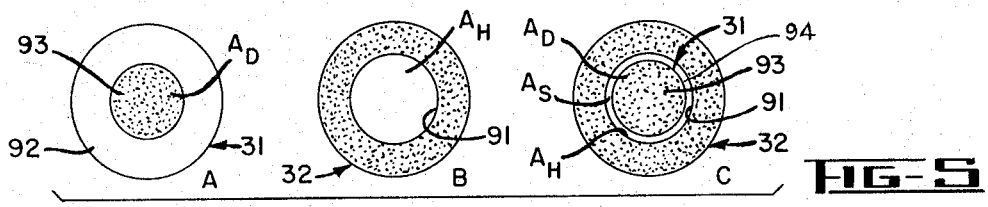
FIGURE 5 shows mask and workpiece configurations for diameter, radius or area measurements of a hole through the workpiece.

Reference is now made to FIGURE 5 wherein front views of the mask 31, workpiece 32 and the workpiece superimposed upon the mask are shown at A, B and C, respectively. For purposes of illustration, the workpiece 32 (FIGURE 5B) is shown comprising an opaque ring in which the central opening 91 is formed concentrically with the circular outer edge thereof. The area and diameter of the opening 91 are designated $A_H$ and $D_H$, respectively. The mask 31 (FIGURE 5A) has the same outside diameter as the workpiece 32 which also is of the same diameter as the tubes 47 and 48 of the apparatus shown in FIGURE 2. Thus, with the mask and workpiece in operative position between the tubes, their centers are located on the optical axis 29. As seen in FIGURE 5A the mask is formed with an outer transparent ring section 92 and a concentric opaque circular center section 93. The area and diameter of the opaque center section of the mask are designated $A_D$ and $D_D$, respectively. The opaque center portion 93 is accurately formed and has a diameter slightly less than the diameter of the hole 91 in the workpiece such that when the mask and workpiece are axially aligned, an annular light transmitting aperture designated 94 in FIGURE 5C is formed for the passage of light therepast. The area of the aperture 94 is designated $A_S$. Any suitable means may be used for producing the mask. For example, it may comprise a transparency printed by a precision microphotographic process from a master mask bearing the desired transparent and opaque information.

With the mask and workpiece in position on the way 44 a thin ring of collimated light passes therethrough and is focused onto the photocell 28. The amount of light striking the photocell 28, and hence the output from the amplifier 33 is directly related to the light transmitting area $A_S$ of the aperture 94 which, in turn is directly related to the area $A_H$ of the opening 91 in the workpiece. If, as assumed above, the opening is circular in shape, the amplifier output is also directly related to the radius and to the diameter of the opening. The voltmeter 34 may be calibrated in terms of area, radius or diameter.

From an examination of FIGURE 5C it will be apparent that the area $A_H$ of the hole or opening 91 equals the area $A_D$ of the opaque disc 93 plus the area $A_S$ of the aperture or slot 94. This may be written as $$A_H = A_D + A_S \quad (1)$$

also:

$$A_S = A_H - A_D \quad (2)$$

Figure 6:
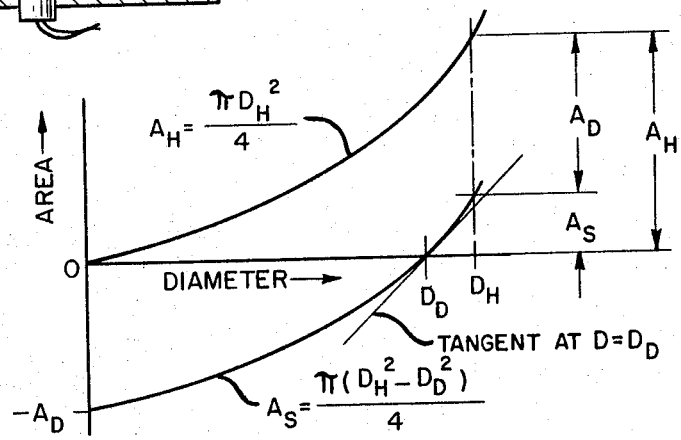
FIGURE 6 is a plot of area versus diameter and graphically depicting the physical arrangement shown in FIGURE 5.
Figure 7:
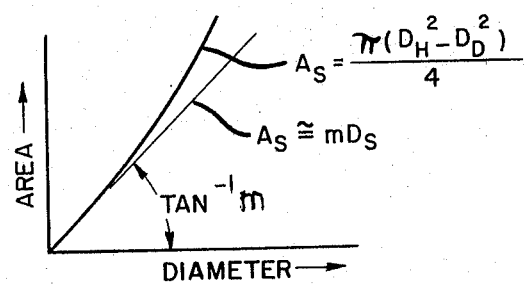
FIGURE 7 shows a portion of curves shown in FIGURE 6.

Referring to FIGURE 6, there is graphically shown a plot of the area $A_H$ versus diameter $D_H$ for the opening 91. Also included is the plot of the area $A_D$ versus diameter $D_D$ for the opaque mask section 93. The result, as indicated by Equation 2 is a plot of the area $A_S$ of the aperture 94 in terms of the diameters $D_H$ and $D_D$. In FIGURE 7, a portion of the $$A_S = \frac{\pi(D_H^2 - D_D^2)}{4}$$

curve is shown in which the ordinate axis has been shifted to the point $D_D$. A tangent line to the curve at the point $D_D$ is also shown in FIGURE 7, which tangent is seen to deviate only slightly from the $A_S$ vs. diameter curve. The equation for the tangent line is:

$$A_S = mD_S \quad (3)$$

where:

$$m = \frac{dA}{dD}\bigg|_{D=D_D} \quad (4)$$

$$= \frac{\pi}{2}D_D$$

= a constant, and $$D_S = D_H - D_D \quad (5)$$

It will be seen, therefore, that as an approximation, the diameter segment $D_S$ is linearly related to the area $A_S$ of the aperture 94. The error in making this approximation is $$\text{error} = \frac{D_S}{D_D + D_H} \quad (6)$$

Therefore, so long as $D_S$ is small compared to the sum of the diameter $D_D$ and $D_H$, the error will be small. Therefore, where the area $A_S$ of the aperture is small, the amount of light striking the photocell 28 is not only directly related to the area $A_H$ of the hole 91, but is also directly related to the diameter $D_H$ thereof.

The typical photoconductive cell of the cadmium sulfide type has a non-linear, approximately log-log characteristic, therefore the resistance of the photocell 28 has an inverse log-log variation with changes in the area $A_H$ of the opening 91. It will be apparent, therefore, the meter 34 may be linearly calibrated in terms of hole area, diameter or radius, only if the amplifier 33 compensates for the log-log response of the photocell 28. By including the photocell 28 in a voltage divider network as shown in FIGURE 4, the required non-linear amplifier response is obtained. Considering the voltage divider network, it will be apparent that the equation for the voltage across the resistor 67 (which voltage supplies the forward bias on the base-emitter junction of the transistor 58 as an input thereto) may be written as $$V_{67} = V_{56}\left(\frac{R_{67}}{R_{28}+R_{68}+R_{67}}\right) \quad (7)$$

wherein $V_{67}$ is the voltage across the resistor 67, $V_{56}$ is the voltage of the constant voltage source 56, and $R_{67}$, $R_{68}$ and $R_{28}$ are the resistances of the resistor 67, potentiometer 68 and photocell 28, respectively. It will be readily apparent that the voltage across the resistor 67 varies inversely and non-linearly with changes in the resistance of the photocell 28. With an increase in the resistance of the photocell 28 the forward bias on the base-emitter junction of the transistor 58 is decreased and the reverse bias on the collector-base junction thereof is increased. Similarly, a decrease in the resistance of the photocell 28 results in an increase in the forward bias on the base-emitter junction of the transistor 58 and a decrease in the reverse bias on the collect-base junction. The collector current of the transistor 58 varies non-linearly with changes in the photocell resistance. With an increase in photocell resistance (resulting from a decrease in light thereon due to a decrease in the diameter of the opening 91 in the workpiece) the voltage drop across the collector load resistor 68 decreases and conversely, when the photocell resistance decreases the voltage drop thereacross increases. The non-linear amplifier response compensates for the non-linear photocell response whereby the arrangement has a substantially linear output with changes in the diameter, radius and area of the opening 91 in the workpiece. By adjustment of the potentiometer 68, the non-linear response of the amplifier may be adjusted for the particular photocell 28 employed to provide the substantially linear system response. For measuring the diameter of different size openings 91 with any one mask, the voltmeter 34 may be linearily calibrated (over the upper portion of the meter range) in terms of diameter, radius, or area, if the size range of the openings is relatively small.

Figure 8:
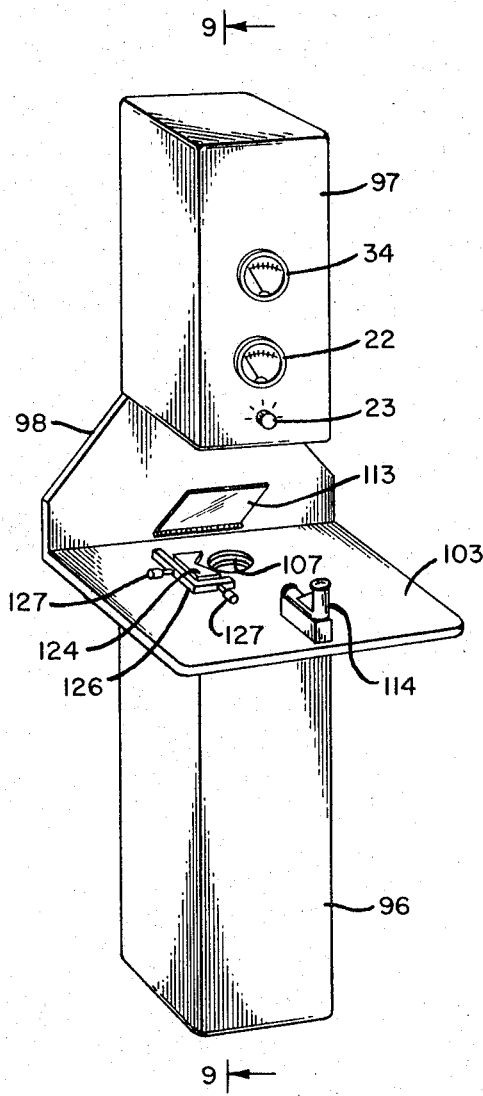
FIGURE 8 is a perspective view of a modified form of this invention showing an upright floor model in which arrangement the optical axis is generally vertically disposed.
Figure 9:
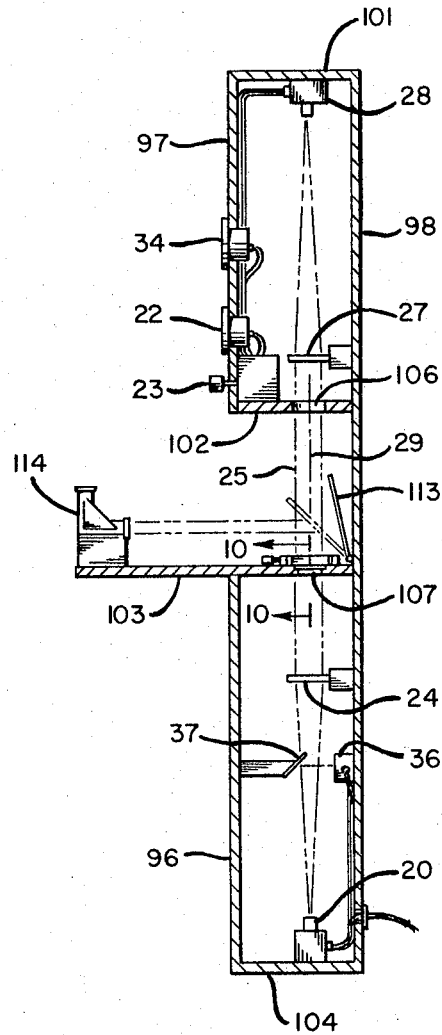
FIGURE 9 is a vertical sectional view taken on line 9—9 of FIGURE 8.

Another embodiment of the invention is shown in FIGURES 8 and 9 of the drawings to which reference is now made. The arrangement shown therein includes the same optical system as that shown in FIGURE 1 and described above. The optical axis 29 of the system however, is vertically rather than horizontally oriented. The light source 20, mirror 37, photocell 36 and collimating lens 24 are located in a lower vertically elongated housing 96 whereas the focusing lens 27 and photocell 28 are mounted in an upper elongated housing 97 which is axially aligned with the lower housing but is positioned a spaced distance thereabove. A rear panel 98 extends from the bottom of the apparatus to the top thereof and portions of said panel comprise the back walls of the upper and lower housing sections. The upper and lower ends of both housing sections are closed by end walls designated 101, 102, 103 and 104, and the adjacent end walls 102 and 103 are formed with holes 106 and 107 to permit the collimating light beam 25 to pass therebetween.

The top wall 103 of the lower section 96 comprises a work table for the support of various elements including the mask and workpiece. The work table 103 extends outwardly beyond the front and side edges of the housing 96 to provide an enlarged supporting surface.

Figure 10:
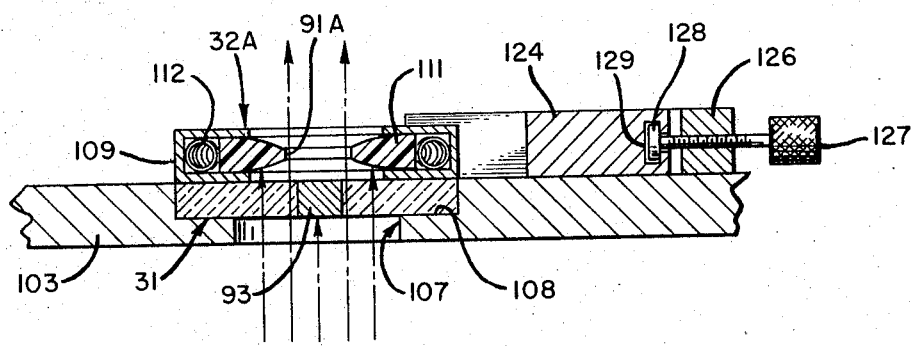
FIGURE 10 is an enlarged fragmentary cross sectional view taken on line 10—10 of FIGURE 9.

Reference is now made to the enlarged fragmentary sectional view of FIGURE 10 wherein the hole 107 in the work table is shown as including an enlarged diameter upper portion whereby a shoulder 108 is formed therein for the support of the mask 31. For purposes of illustration a workpiece 32A comprising an oil seal is shown positioned on the table 103 directly over the mask in axial alignment therewith. Such a seal may comprise an annular outer channel-shaped casing member 109 within which an inner resilient seal ring 111 is mounted. A resilient back up member 112 may be positioned at the bottom of the channel for the support of the seal ring about its outer periphery. For long seal life, the opening 91A must be of the proper diameter and must be concentric with the periphery of the casing 109.

To measure diameter, the mask 31 which was described in detail above with reference to FIGURE 5 is employed, and is seated on the shoulder 108 formed in the opening 107 in the work table. The seal is placed on the table over the mask with the hole 91A in the seal in axial alignment with the opaque center section 93 of the mask. To aid in properly positioning the workpiece, there is included a mirror 113 which is pivotally mounted on the rear wall 98 above the work table 103. The mirror may be swung between a generally vertical position, as shown in solid lines in FIGURE 9, to a position extending at about a 45 degree angle with the work table. In the generally vertical position the mirror is outside the path of the collimated light beam and does not interfere with the passage thereof to the photocell 28. With the mirror swung down to the broken line position, however, the light beam is reflected horizontally to a viewing instrument 114 mounted at the front of the work table 103. The instrument 114 merely reflects the beam upwardly again for easy viewing by the operator. Under these conditions, with the workpiece superimposed upon the mask, the operator is able to view the light which passes the mask and workpiece and by adjusting the position of the workpiece on the mask, is able to axially locate the hole 91A therein with the circular opaque section 93 of the mask wherein a thin annular beam of light is visible to the operator. The mirror 113 is then swing back away from the light beam and the amount of light striking the photocell 28 comprises a direct measure of the diameter of the hole 91A, which measurement may be read off the calibrated indicator 34. As described above, with this arrangement a measure of the hole radius and area are also provided and the indicator 34 could be calibrated in such terms. The mirror 113 provides an inexpensive means by which the position of the workpiece with respect to the mask may be readily ascertained. The workpiece does not have to be precisely located, it only being necessary that the beam of light which is visible to the operator comprise a closed line with the outer edge of the beam having the shape of the aperture 91A.

Figure 11:
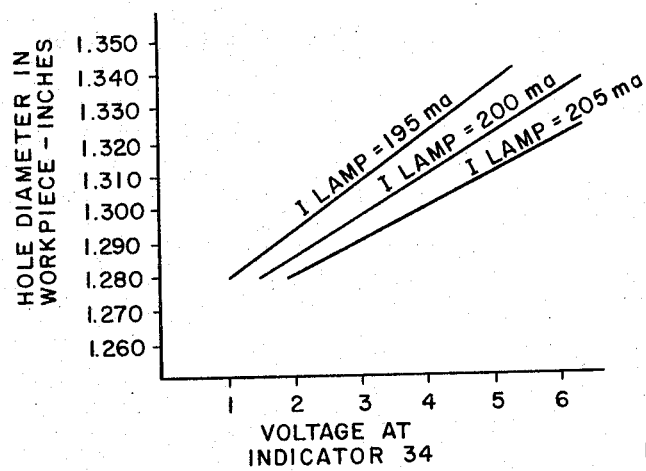
FIGURE 11 shows curves of the hole diameter of a workpiece versus voltage output from the apparatus of this invention.

Response curves for a typical system embodying this invention are shown in FIGURE 11 of the drawings, the different curves being for different lamp currents (and, therefore, different lamp intensities). In the illustrated curves, the voltage at the indicator is substantially a linear function of the diameter of the hole 91A in the workpiece within the diameter range of 1.280 to 1.340 inches with a mask having an opaque circular section 93, 1.265 inches in diameter. For measuring smaller or larger diameter holes, a mask with a respective smaller or larger diameter opaque section 93 would be employed. Thus, it will be apparent that the apparatus of this invention may be used to measure a wide range of diameters. It will be further apparent that the apparatus is not limited to measurements on circular holes or circular objects. For example, the area of any shaped hole may be measured by use of a mask which blanks out all but a thin line of light about the periphery thereof.

Figure 12:
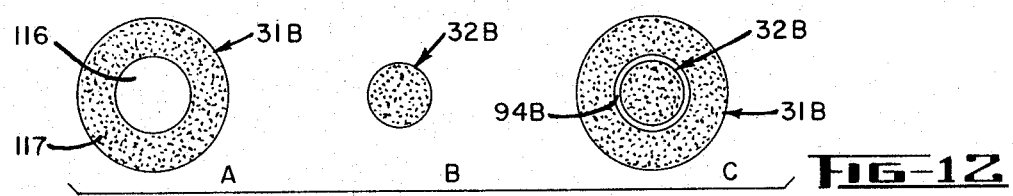
FIGURE 12 shows mask and workpiece configurations for diameter, radius or area measurements of the cross section of a workpiece.
Figure 13:
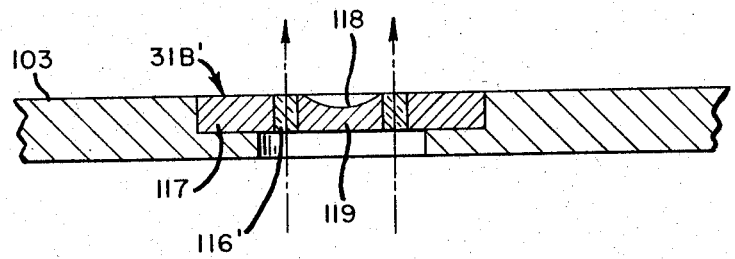
FIGURE 13 is a cross sectional view which is similar to the view of FIGURE 10 but showing a different mask configuration.
Figure 14:
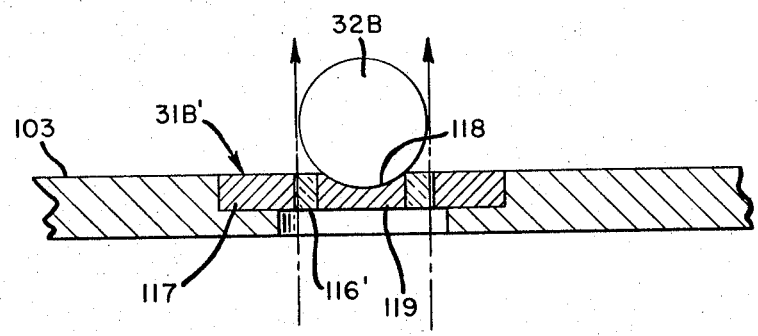
FIGURE 14 is a view which is similar to that shown in FIGURE 13 but showing also a workpiece in the form of a ball positioned on the mask.

Reference is now made to FIGURE 12 of the drawings wherein a mask 31B for measurement of the cross sectional diameter of an opaque circular workpiece 32B is shown comprising a circular transparent center section 116 surrounded by a ring of opaque material 117. The inside diameter of the opaque ring 117 is slightly larger than the diameter of the workpiece 32B such that an annular beam of light passes the mask and workpiece through the slot 94B when they are superimposed in axially aligned relation as shown in FIGURE 12C. With any given mask the amount of light which passes the mask and workpiece will depend upon the diameter of the workpiece whereby the meter may be calibrated in terms of workpiece diameter.

Where the opaque workpiece is in the form of a ball, or the like, the mask may be provided with a circular cup-shaped, indentation to hold the same. Such a mask, designated 31B' is shown in FIGURES 13 and 14, which mask is formed with an indentation 118 in the center thereof within which the ball-shaped workpiece 32B may be seated as shown in FIGURE 14. In this manner, the workpiece is properly positioned to allow a thin annular beam of light to pass the mask and workpiece.

The calibration of the apparatus may be checked by the use of standard workpieces of predetermined size. For example, where the inside diameter of workpieces is being measured as with the arrangement shown in FIGURE 5, annular standard workpieces with transparent apertures of precise, known size may be employed; and where the outside diameter of an opaque workpiece is being measured as with the arrangement of FIGURE 12, circular standard workpieces of precise diameter may be used. In addition, with this invention, the apparatus may be set up to provide an automatic check of the calibration thereof each time the workpiece is removed therefrom. This is accomplished by providing a predetermined sized light transmitting area when the workpiece is removed. In FIGURES 13 and 14, there is shown a mask 31B' which is similar to the mask 31B shown in FIGURE 12 except that a central opaque section 119 is provided which is surrounded by concentric annular light-transmitting and opaque rings 116', and 117, respectively. The diameter of the circular opaque section 119 is smaller than the smallest-diameter workpiece 32B to be measured whereby the section 119 has no effect on the diameter readings when a workpiece 32B is in position thereon. By forming the section 119 with a predetermined diameter, a light transmitting area of known size is provided through the transparent section 116' when the workpiece is removed therefrom. Knowing this area, a check of the calibration of the apparatus is provided whenever the workpiece is removed from the apparatus. That is, with the workpiece removed, the indicator 34 will return to a predetermined position, and if it varies therefrom drift in the system is indicated and recalibration is in order.

In a similar manner, the mask 31 shown in FIGURE 5 may be provided with an outer opaque ring having a known inside diameter larger than the largest diameter $D_H$ aperture to be measured. Such opaque ring would have no effect upon workpiece inside diameter measurements provided by the apparatus. However, with the workpiece removed from the apparatus, a known light transmitting area is provided between the center opaque section 93 and outer opaque ring section for an automatic check of the calibration of the apparatus. Alternative automatic calibration checking means include simply placing and leaving a standard workpiece on the apparatus, which workpiece has a larger inside diameter $D_H$ than the largest diameter aperture to be measured.

Figure 15:
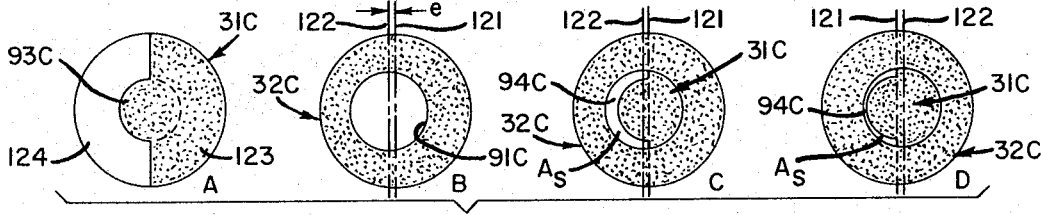
FIGURES 15 through 18 show various mask and workpiece configurations for eccentricity and ovalness measurements of workpieces.

Reference is now made to FIGURE 15 wherein there is shown a mask 31C which is suitable for measuring the eccentricity of the hole 91C in the workpiece 32C with respect to the outside diameter thereof. The circular opening 91C through the workpiece is eccentrically located with respect to the circular outer edge of the workpiece by an amount designated by the letter $e$, the parallel lines 121 and 122 being drawn through the axes of the said workpiece and hole respectively. The mask 31C may be considered as comprising an opaque circular center section 93C surrounded by a concentric ring having an opaque segment 123 and a transparent segment 124. The opaque and transparent segments of the ring need not be of equal length; the relative length of each depending upon the diameter of the hole 91C and various adjustments of the electronic circuitry described above. The mask 31C is placed in the opening 107 (see FIGURE 10) and the workpiece 32C is placed on top thereof in axial alignment therewith.

To measure concentricity, the mask and workpiece must be relatively rotated. In the arrangement illustrated in FIGURE 2, the workpiece or mask may simply be rotated while in position on the way 44. In the arrangement shown in FIGURES 8 and 9, an adjustably positioned V-block 124 is mounted on the table 103 against which the workpiece may be butted. As seen also in FIGURE 10 an L-shaped frame 126 may be secured to the table adjacent the hole 107 by any suitable means not shown. An adjusting screw 127 extends through each leg of the frame, and enlarged diameter end portions 128 of the adjusting screws engage enlarged bottomed slots 129 formed along adjacent right angle sides of the V-block 124. By adjusting the screws 127, the V-block 124 may be moved both radially and transversely of the hole 107 in the table. With the workpiece 32C (FIGURE 15B) held against the groove in the V-block 124, the screws 127 are adjusted to locate the workpiece axially with the mask.

In FIGURES 15C and 15D, two views of the workpiece superimposed on the mask are shown. In one of the views the mask and workpiece are in one relative rotary position and in the other view the workpiece, but not the mask is shown rotated 180 degrees. In any relative rotary position of the mask 31C and workpiece 32C, a generally semi-annular beam of light passes thereby. As the mask and workpiece are relatively rotated, the thickness (but not the length) of the light beam aperture 94C will change in an amount depending upon the eccentricity of the hole in the workpiece. In FIGURE 15 the relative positions for maximum and minimum size light beam apertures are shown. The percentage area change of $A_S$ (as indicated by the difference in the reading on the indicator 34 between such maximum and minimum positions) is directly related to the percentage diameter change which, in turn, is directly related to the eccentricity of the workpiece. The greater the difference in the meter reading as the parts are relatively rotated, the greater is the eccentricity. It will be apparent that such eccentricity readings also provide a measure of the variation in the thickness of the wall of the workpiece.

Figure 16:
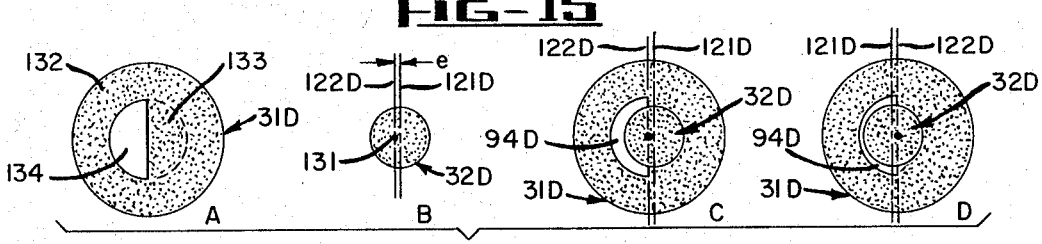

In a manner similar to that described above, the eccentricity of an opaque circular cross sectional workpiece 32D shown in FIGURE 16 about its rotary axis 131 may be measured. A mask 31D which may be considered as having an opaque outer ring portion 132 and a concentric center section comprising an opaque sector 133 and transparent sector 134 is employed for measuring the eccentricity. The diameter of the circular center section is greater than the diameter of the workpiece 32D whereby a generally semi-annular beam of light may pass thereby when the mask and workpiece are superimposed on each other with the rotary axis 131 of the workpiece located on the axis of the mask. When the workpiece is rotated about its rotary axis, the generally semi-annular light beam slot 94D will change thickness to pass a greater or lesser amount of light. A line 122D is shown extending through the rotary axis 131 and a parallel line 121D is shown extending through the true axis of the workpiece. Again, a measure of the eccentricity $e$ is provided by the difference in the maximum and minimum readings of the indicator 34.

Figure 17:
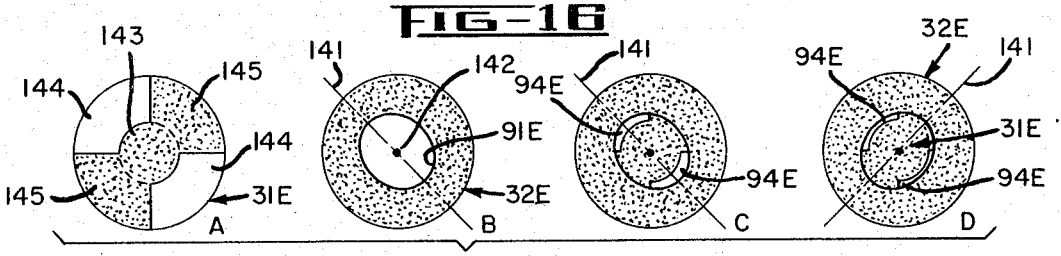

Reference is now made to FIGURE 17A wherein there is shown a mask 31E for the measurement of the ovalness of an aperture formed in a workpiece, and in FIGURE 17B there is shown a circular workpiece 32E having an oval opening 91E therethrough. For purposes of illustration a symmetrical oval, or elliptical, opening is shown in which the major axis 141 extends through the axis 142 of the circular workpiece. The mask 31E may be considered as comprising an opaque circular center section 143 surrounded by a concentric ring comprising a pair of diametrically opposed transparent sections 144 between which there is included a pair of diametrically opposed opaque sections 145. The diameter of the opaque circular center section 143 is less than the smallest dimension of the ellipse through the axis 142. With the mask and workpiece superimposed, a pair of diametrically opposed and generally annular light beam segments will pass thereby. As the mask and workpiece are relatively rotated, the thickness of the light beam apertures 94E change depending upon the ovalness of the hole 91E. In FIGURES 17C and 17D the relative positions for maximum and minimum size light beam apertures are shown. The difference in the reading on the indicator 34 between such positions is directly related to the ovalness of the aperture.

Figure 18:
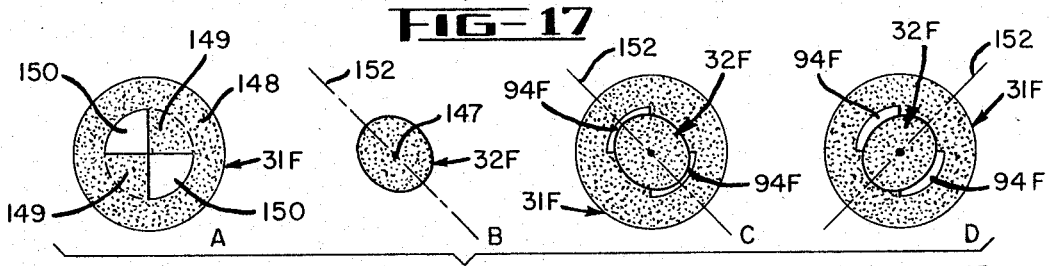

Reference is now made to FIGURE 18A wherein there is shown a mask 31F for the measuring of the ovalness of an opaque workpiece 32F (FIGURE 18B) about its axis 147 of rotation. The mask 31F may be considered as comprising an opaque outer ring section 148 and a concentric center section comprising a pair of diametrically opposed opaque sectors 149 between which is a pair of diametrically opposed transparent sectors 150. The diameter of the center circle is greater than the largest dimension of the oval workpiece along its major axis 152. With the mask and workpiece superimposed, a pair of diametrically opposed and generally annular light beam segments will pass thereby. As the mask and workpiece are relatively rotated the thickness of the light beam apertures 94F change depending upon the ovalness of the workpiece. In FIGURES 18C and 18D the two views showing the workpiece superimposed on the mask differ only in that in one view the workpiece 32F is rotated 90 degrees about the axis 147 from that shown in the other view. Again, the difference in the readings of the indicator 34 with the workpiece in the two positions is directly related to the ovalness thereof.

Having now described the invention in detail in accordance with the requirements of the Patent Statutes various other changes and modifications will suggest themselves to those skilled in this art. A mask for any shape of workpiece or workpiece opening may be employed for measuring the area thereof. For example, the area of square, rectangular, triangular, etc., workpieces may be measured by use of masks having a transparent section of slightly greater dimensions than the workpiece whereby a thin-closed-line beam of light passes said workpiece and mask when interposed in the collimated beam. Knowing the area of the transparent portion of the mask and measuring the cross sectional area of the light beam by use of the photocell 28, a measure of the workpiece area is provided. It is intended that such changes and modifications shall fall within the spirit and scope of the invention as recited in the following claims.

I claim:

1. An optical gauge for measuring the eccentricity of a circular opening formed in an opaque circular workpiece about the axis of the workpiece, said gauge comprising a source of collimated light; a photocell; an opaque mask formed with a generally semi-annular transparent area with a radius smaller than the radius of the circular opening formed in said workpiece, said workpiece and said mask being disposed in the path of collimated light and together blocking out all but a generally semi-annular beam of light which passes thereby and onto said photocell, and means for relatively rotating said mask and workpiece whereby the eccentricity of said workpiece is indicated by a variation in the amount of light striking said photocell as the mask and workpiece are relatively rotated.

2. An optical gauge for measuring the ovalness of a generally circular opening through an opaque workpiece, said gauge comprising a source of collimated light, a photocell, an opaque mask formed with a ring of alternate and symmetrical transparent and opaque areas, said ring including a pair of diametrically opposed opaque areas separated by a pair of transparent areas, the inner radius of the ring being smaller than the largest radial dimension of the generally circular opening formed in said workpiece, said workpiece and said mask being disposed in the path of collimated light and together blocking out all but a pair of annular light beam segments which pass thereby and onto said photocell, and means for relatively rotating said mask and workpiece whereby the ovalness of the generally circular opening through said workpiece is indicated by a variation in the amount of light striking said photocell as the mask and workpiece are relatively rotated.

3. An optical gauge for measuring the eccentricity of a circular opaque workpiece about an axis of rotation of the workpiece, said gauge comprising a source of collimated light, a photocell, an opaque mask formed with a generally semi-circular transparent area having a radius greater than the radius of said generally opaque workpiece, said workpiece and said mask being disposed in the path of collimated light and together blocking out all but a generally semi-annular beam of light which passes thereby and onto said photocell, and means for relatively rotating said mask and workpiece about the axis of rotation of said workpiece whereby the eccentricity of said workpiece is indicated by a variation in the amount of light striking said photocell as the mask and workpiece are relatively rotated.

4. An optical gauge for measuring the ovalness of a generally circular opaque workpiece, said gauge comprising a source of collimated light, a photocell, an opaque mask formed with a ring of alternate and symmetrical transparent and opaque areas, said ring including a pair of diametrically opposed opaque areas separated by a pair of transparent areas with the outer radius of the ring being larger than the largest radial dimension of said generally circular workpiece, said workpiece and said mask being disposed in the path of collimated light and together blocking out all but a pair of annular light beam segments which pass thereby and onto said photocell, and means for relatively rotating said mask and workpiece whereby the ovalness of the workpiece is indicated by a variation in the amount of light striking said photocell as the mask and workpiece are relatively rotated.

5. An optical gauge for measuring the area of a light transmitting section in an opaque workpiece comprising,
   a source of collimated light,
   a photocell,
   a mask formed with an opaque area of substantially the same shape and of smaller size than the light transmitting section in said workpiece,
   said mask and said workpiece being disposed in the path of collimated light and together blocking out most of the light from the source to the photocell, the cross section of the light beam after passing said workpiece and mask comprising a thin closed line, the amount of light striking said photocell providing a measure of the area of the light transmitting section in the workpiece.

6. The optical gauge as recited in claim 5 wherein the light transmitting section of the workpiece and the opaque area of the mask are of circular shape, and the beam cross section after passing said workpiece and mask is of annular shape.

7. An optical gauge for measuring a cross sectional area of an opaque workpiece comprising,
   a source of collimated light,
   a photocell,
   an opaque mask formed with a light transmitting section of substantially the same shape and of greater size than the cross sectional area of said opaque workpiece,
   said mask and said workpiece being disposed in the path of collimated light and together blocking out most of the light from the source to the photocell, the cross section of the light beam after passing said workpiece and mask comprising a thin closed line, the amount of light striking said photocell providing a measure of the cross sectional area of the workpiece.

8. The optical gauge as recited in claim 7 wherein the opaque workpiece and light transmitting section of the mask are of circular shape and the beam cross section after passing said workpiece and mask is of annular shape.

References Cited by the Examiner

UNITED STATES PATENTS

| | | | |
|---|---|---|---|
| 2,433,558 | 12/1947 | Hurley | 88—14 |
| 2,765,704 | 10/1956 | Mottu | 88—14 |

RALPH G. NILSON, *Primary Examiner.*

M. ABRAMSON, *Assistant Examiner.*